United States Patent [19]

Shirouzu

[11] 3,923,332

[45] Dec. 2, 1975

[54] TRANSPLANTER

[76] Inventor: Atsushi Shirouzu, Minami No. 22, Heiwa-Dori 1-chome, Shiraishi-cho, Sapporo, Hokkaido, Japan

[22] Filed: Mar. 1, 1973

[21] Appl. No.: 337,009

Related U.S. Application Data

[62] Division of Ser. No. 190,113, Oct. 18, 1971, abandoned.

[30] Foreign Application Priority Data

Oct. 20, 1970 Japan.............................. 45-104417
Apr. 19, 1971 Japan.............................. 46-25554

[52] U.S. Cl................ 294/87 R; 294/28; 294/104
[51] Int. Cl.².......................................... B66C 1/00
[58] Field of Search................. 294/15, 16, 27–31, 294/87, 87.22, 87.24, 87.26, 87.28, 103, 104, 106, 118, 119; 111/1, 2, 4, 50, 72; 209/126; 269/6

[56] References Cited

UNITED STATES PATENTS

| | | | |
|---|---|---|---|
| 536,003 | 3/1895 | Volkenrath............................ | 294/29 |
| 1,252,226 | 1/1918 | Bonk................................. | 294/87 R |
| 1,350,984 | 8/1920 | Blank et al........................ | 294/87 R |
| 1,730,444 | 10/1929 | Anderson............................... | 294/3 |
| 2,069,523 | 2/1937 | Gilbert............................ | 294/31 R |
| 2,507,368 | 5/1950 | Carlson............................... | 294/16 |
| 2,636,771 | 4/1953 | Schneider........................... | 294/104 |
| 2,708,592 | 5/1955 | Dalkranian........................ | 294/31 R |
| 3,059,954 | 10/1962 | Matejicek........................... | 294/16 |
| 3,583,745 | 6/1971 | Stuart................................. | 294/28 |

*Primary Examiner*—Evon C. Blunk
*Assistant Examiner*—Johnny D. Cherry
*Attorney, Agent, or Firm*—Stevens, Davis, Miller & Mosher

[57] ABSTRACT

A transplanter comprising a conveyor for conveying one row after another of a plurality of seedlings from a seedling supply section to a seedling delivery section, and a toothed wheel formed on its peripheral surface with a plurality of teeth each tooth being formed with a seedling moving surface and a seedling supporting surface. Said toothed wheel is disposed at a discharge end of said conveyor and coupled to the conveyor for operation in conjunction therewith so that one seedling after another is separated from the rest of the seedlings on the conveyor by said toothed wheel and supplied to the seedling delivery section which is actuated in timed relation with the toothed wheel.

8 Claims, 5 Drawing Figures

TRANSPLANTER

This is a division, of application Ser. No. 190,113, filed Oct. 18, 1971, now abandoned.

This invention relates to transplanters and more particularly it is concerned with a transplanter for plant-setting seedlings of beat, vegetables, tobacco, trees, etc. in a paper cylinder to the fields.

This invention provides improvements in or relating to the transplanter disclosed in the U.S. Pat. No. 3,374,752.

In mechanically setting seedlings to the fields by means of a transplanter, it has hitherto been customary to raise seedlings in an orderly manner such that the seedlings can be separated from one another, supply the seedlings raised in this way to a transplanter individually or in a row, and set the seedlings one by one to the fields.

The seedlings grown in a group gathered together in a manner such that they are regularly and separably arranged as aforementioned for transplantation by means of a transplanter have hitherto been raised by different processes. In one process known in the art, seedlings are raised in paper cylinders or other seedling raising containers; in another process, seedlings are raised in kneaded earth in which cuts are made; and in still another process, seedlings are prepared such that their roots each embraces earth.

When the seedlings raised in paper cylinders, for example, are supplied to a conveyor in a seedling supply section of a transplanter and regularly and successively conveyed to a seedling delivery section in which the seedlings are taken hold by means for setting the seedlings to the fields, the supply of seedlings have tended to be interrupted and realization of regular and successive delivery of the seedlings has been hampered.

In using paper cylinders of seedling containers for raising seedlings, it has been customary in the art to use substantially hexagonal or square paper containers which are grouped together in a conglomerate of substantially honeycomb shape. Such seedling containers are separated from each other after seedlings have grown to a predetermined size therein and placed on a conveyor provided with partition walls so as to enable the seedling containers to be conveyed at regular intervals and finally set to the fields mechanically.

This system of handling seedling containers requires a lot of manual attention because individual containers must be manually separated from the conglomerate of seedling containers and placed on the conveyor one after another.

In order to obviate this problem a device has been developed for supplying one row after another of seedling containers successively to a conveyor having no partition walls and one seedling container after another is delivered from each row of seedling containers on the conveyor to a seedling delivery section to be set to the fields.

This device also requires manual attention for separating one row after another of seedling containers from a substantially honeycomb-shaped conglomerate of seedling containers.

This invention obviates the aforementioned disadvantage of the prior art. Accordingly, an object of this invention is to provide a transplanter in which one seedling after another can be positively supplied in a controlled manner from a conveyor of a seedling supply section of the transplanter to a seedling delivery section thereof without the supply of seedling being interrupted so that the mechanical operation of plant-setting seedlings to the fields can be carried out at high efficiency.

Another object of the invention is to provide a transplanter in which one row after another of a plurality of paper cylinders or other containers each containing a seedling therein can be separated from a conglomerate of such containers and supplied to a conveyor positively and efficiently.

These and other objects and features of the invention are pointed out in the following description in terms of the embodiment thereof which is shown in the accompanying drawings, in which.

Figure 1:
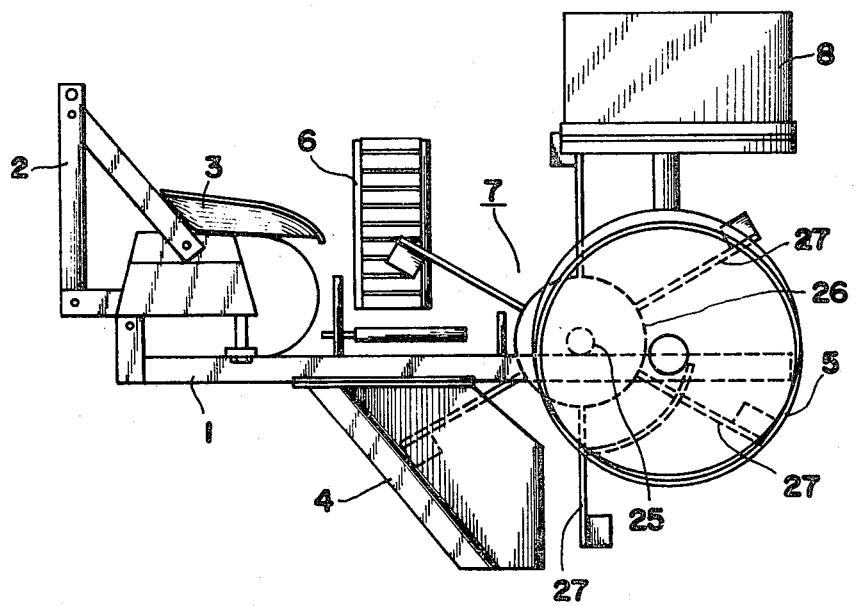
FIG. 1 is a side view of the transplanter comprising one embodiment of this invention.

The transplanter illustrated in FIG. 1 comprises a machine frame 1 which has a tractor connecting frame 2 mounted at its front portion and an operator's seat 3 disposed at its upper front portion. The machine frame 1 also has at its lower portion an opener 4 for opening rows or drills when the transplanter is drawn by the tractor and at its rear portion a soil covering wheel 5.

Mounted at an intermediate portion of machine frame 1 is a seedling conveyor 6 having a discharge end which is disposed adjacent a seedling delivery station 7.

A box 8 for housing therein a conglomerate of seedlings is disposed on machine frame 1.

In operation, machine frame 1 is pulled by the tractor for opening rows or drills for planting seedlings therein. At the same time, the operator in his seat 3 takes out one row after another of a plurality of seedlings from the box 8 and places them on conveyer 6 to be conveyed to the delivery section 7 in which one seedling after another is delivered and automatically planted in the fields. The seedlings planted in the fields in this way are covered with soil by soil covering wheel 5.

The seedling supply device according to this invention will now be described with reference to FIGS. 2 and 3. In the seedling supply section generally designated 11, seedling conveyor 6 comprises a conveyor belt 16 trained about pulleys 14 and 15 which are respectively supported by a drive shaft 12 and a driven shaft 13 rotatably supported at opposite sides of machine frame 1.

A plurality of toothed wheels 20 arranged in side by side relation each having on its peripheral surface a number of teeth 19 each being formed with a seedling moving surface 17 and a seedling supporting surface 18 are disposed on opposite sides of the pulley 14 supported by drive shaft 12. Seedling moving surfaces 17 and supporting surfaces 18 are disposed alternately on the outer periphery of wheels 20.

Figure 3:
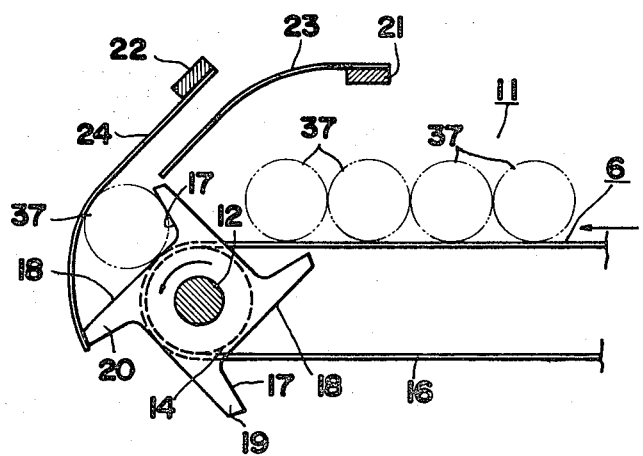
FIG. 3 is a fragmentary vertical sectional view of the supply device of FIG. 2.
Figure 2:
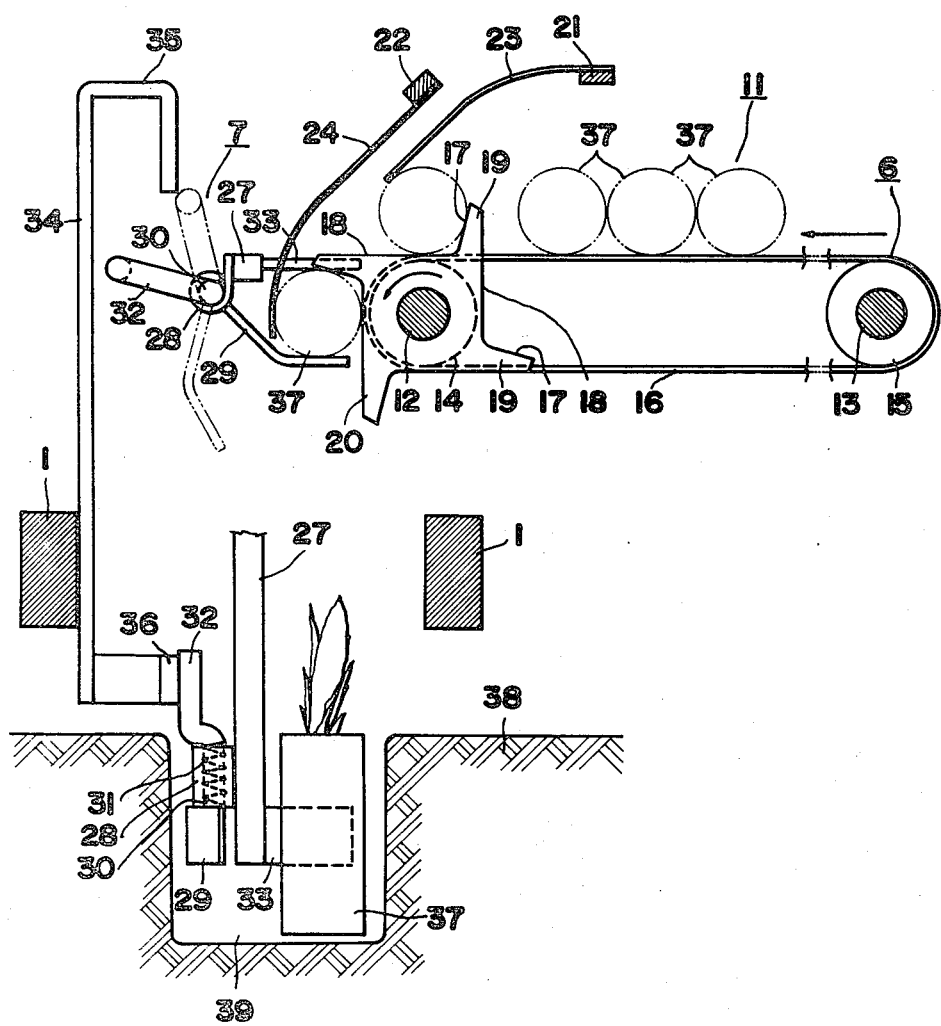
FIG. 2 is a vertical sectional view of the seedling supply device of the transplanter according to this invention.

Resilient presser plates 23 and 24 which may be made of plate springs are respectively attached to mounting bars 21 and 22 affixed to machine frame 1, so that presser plate 23 is disposed substantially above toothed wheels 20 and presser plate 24 is disposed at left side of toothed wheels 20 in FIGS. 2 and 3.

A seedling delivery device is mounted in seedling delivery section 7 and disposed adjacent to seedling supply device 11 and at right angles to conveyor 6. Seedling delivery device 7 comprises a discal rotary body 26 mounted on a shaft 25 supported by machine frame 1 and coupled to the drive shaft 12 of seedling supply device 11 to rotate in conjunction therewith, and a number of arms 27 radially projecting outwardly of rotary body 26 as shown in FIG. 1.

Each arm 27 is formed at its forward end portion with a bearing portion 28 as shown in FIG. 2 which supports a shaft 30 mounting a base of a pivotal member 29 for pivotal motion. Pivotal member 29 is bent substantially at its intermediate portion and normally biased by the biasing force of a spring 31 in the counter clockwise direction in FIG. 2.

A substantially L-shaped engaging member 32 is affixed to shaft 30, and a fixed member 33 disposed in cooperative relation with pivotal member 29 is affixed to each arm 27.

Mounted vertically on machine frame 1 is an upright bar 34 which is formed at its upper and lower end portions with engaging portions 35 and 36 with which engaging member 32 is brought into and released from engagement.

Operation of seedling supply device 11 and seedling delivery device at 7 constructed as aforementioned will now be described. A row of a plurality of seedlings 37 raised in containers 37 made as of paper is placed transversely of the belt 16 of conveyor 6 of supply device 11, and drive shaft 12 is driven counter clockwise in FIG. 2. This moves belt 16 through pulleys 14 and 15 in the direction of an arrow in FIG. 2 so as to convey seedlings 37 to the delivery station 7 shown on the left side in FIG. 2.

Simultaneously as drive shaft 12 rotates counter clockwise in FIG. 2, the toothed wheels 20 mounted on drive shaft 12 begin to rotate counter clockwise in FIG. 2, and a frontmost seedling of the row of seedlings 37 on the belt 16 is flipped upwardly at its outer wall surface by the two moving surfaces 17 of two teeth 19 of the plurality of toothed wheels 20 and move leftwardly and upwardly in FIG. 2, so that one seedling after another can be successively separated from the row of the plurality of seedlings on the conveyor and moved to the left.

The seedling 37 flipped and moved by the moving surfaces 17 of toothed wheels 20 and supported by the supporting surfaces 18 thereof is held in position by resilient presser plate 23 which comes into contact with the seedling 37. However, as toothed wheels 20 rotate, the seedling 37 is moved forwardly against the restraining force of resilient presser plate 23 till it is released from engagement with the plate 23.

Further movement of the seedling 37 brings it to a position in which it is held in a concave space defined by another resilient presser plate 24 and the adjacent moving surfaces 17 and supporting surfaces 18 of toothed wheels 20 and supplied to the seedling container delivery device 7 which operates in timed relation with the seedling supply device 11.

As one of the radially extending arms 27 of rotary body 26 moves from above the upper engaging portion 35 of upright bar 34 shown in FIG. 2 to below it with the rotation of rotary body 26, the L-shaped engaging member 32 impinges on the upper engaging portion 35 and moves pivotally clockwise about shaft 30 in FIG. 2 against the biasing force of spring 31. This causes, through shaft 30, pivotal member 29 to move in pivotal motion, so that pivotal member 29 is moved away from fixed member 33 as shown by a dash-and-dot line in FIG. 2.

Simultaneously as the fixed member 33 of the arm 27 reaches a position in which it is disposed on an upper surface of the seedling 37 following further downward movement of the arm, the engaging member 32 is released from engagement with the upper engaging portion 35 and restored to its original position by the biasing force of spring 31 mounted on bearing portion 28, thereby restoring pivotal member 29 to its original position and permitting the seedling 37 to be held momentarily by the fixed member 33 and pivotal member 29 operating in cooperative relationship.

As the arm 27 further moves downwardly to a position in which it is disposed in a drill 39 formed in fields 38 by opener 4 for planting seedlings therein, the engaging member 32 impinges on the lower engaging portion 36 of vertical bar 34 and causes pivotal member 29 to pivot, so that the seedling 37 held between the pivotal member 29 and fixed member 33 is released and allowed to move downwardly into the drill 39. Then, the seedling 37 is covered with earth by soil covering wheel 5.

In this way, the supply device 11 according to this invention supplies one row after another of a plurality of seedlings by means of conveyor 6 to the seedling delivery device 7 in which one seedling after another is successively separated from the row of seedlings at the discharge end of conveyor by toothed wheels 20 to be delivered regularly and successively for plant-setting of seedlings. The seedling supply and delivery devices according to this invention are actuated in timed relation with each other and seedlings can positively be delivered at all times without interruption to thereby carry out a seedling plant-setting operation at high efficiency.

The seedling separating device according to this invention will be described with reference to FIGS. 4 and 5. The device includes a frame 41 having at its front surface an engaging plate 42 bent forwardly at its upper end portion to form an engaging edge 43.

Upper and lower support plates 44 affixed to upper and lower portions of engaging plate 42 and extending rearwardly have a handle 45 attached to outer or rear end portions of the two support plates 44.

Bearing portions 46 are affixed to opposite ends of engaging plate 42 and extend rearwardly to support, through stub shafts 47, two arms 48 at their lower ends. A support rod 49 is mounted between the upper end portions of the two arms 48 and supports a number of arcuate needles 50 attached to its front surface at regular intervals and extending forwardly. Arcuate needles 50 each form a part of an imaginary circle centered at each shaft 47. Right and left support plates 51 are secured at front end portions thereof to support rod 49 in two positions substantially spaced apart from each other and from opposite ends of support rod 49 and have a handle 52 secured to outer or rear end portions of right and left support plates 51.

53 designates a conglomerate of paper containers of hexagonal shape arranged in a substantially honeycomb shape and capable of being separated one by one from the conglomerate. Seedlings are raised in these containers till they reach a predetermined size.

When it is desired to separate a row of seedling containers 53 from the conglomerate, the operator grips handle 45 by one hand and brings the engaging plate 42 of frame 41 into engagement with front surfaces of a front row of seedling containers 53 such that the engaging edge 43 of engaging plate 42 engages upper end portions of seedling containers 53.

Figure 4:
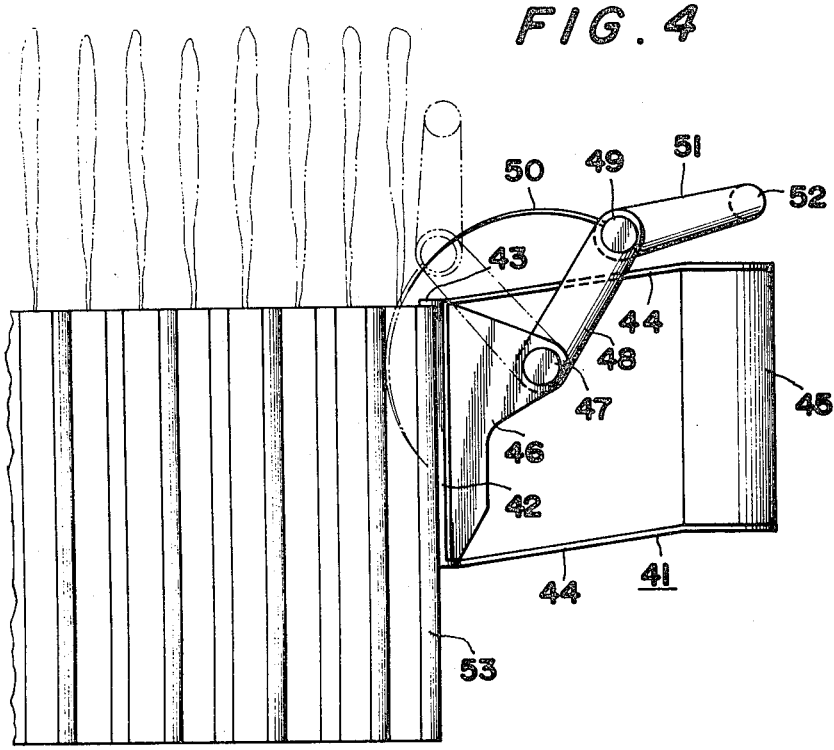
FIG. 4 is a side view of the seedling separating device of the transplanter according to this invention.
Figure 5:
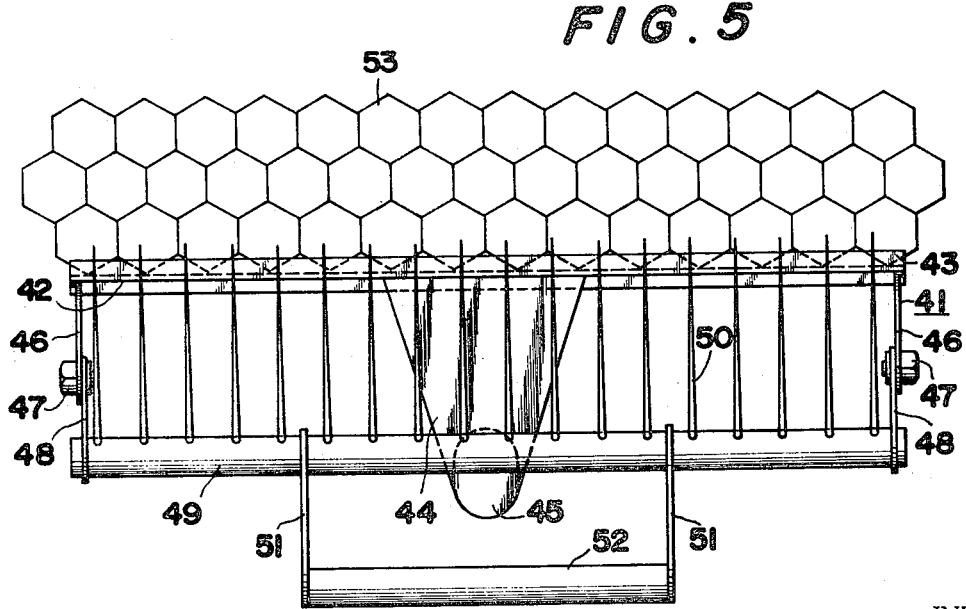
FIG. 5 is a plan view of the separating device of FIG. 4.

Then, handle 52 is gripped by the other hand and support rod 49 is pivoted counter clockwise about stub shafts 47 in FIG. 4 through arms 48 to cause arcuate needles 50 to pierce seedling containers 53 from above through their upper surfaces so that tips of needles 50 and the front surface of engaging plate 42 may grip a front row of seedling containers 53.

If handle 45 is pulled toward the operator at this time, the front row of seedling containers 53 can be separated from the rest of the seedling containers 53 and held by needles 50. The separated row of seedling containers 53 is then placed on the conveyor belt. If handle 52 is moved outwardly, then the row of seedling containers 53 held by needles 50 is released and deposited on the conveyor belt.

The seedling container separating device according to this invention permits to separate one row after another of seedling containers made of paper in any shape as desired from a group of seedling containers arranged substantially in a honeycomb shape and supply them to the conveyor successively without interruption, thereby increasing the efficiency of a seedling planting operation.

The arcuate needles 50 of seedling container separating device according to this invention have been described as piercing the seedling containers 53 from above through the upper surfaces of seedling containers 53. It is to be understood, however, that the invention is not limited to this form of operation of needles 50 and that needles 50 may operate from below and pierce the seedling containers through their undersides in embracing relationship or needles may act both from above and below to hold the seedling containers therebetween and lift them.

What is claimed is:

1. A seedling container separating device comprising a frame, an engaging plate provided in front of said frame so as to engage with a plurality of seedling containers, arms connected by shafts to said frame so as to rotate freely about said shafts, a support rod connected to said arms for rotation therewith and a plurality of arcuate needles provided on said support rod for piercing said containers, the arc defined by each of said needles being coincident with a portion of the circumference of an imaginary circle centered on the axis of rotation of said rod so that the movement of said needles follows the circumference of said circle to pierce said containers upon said rod being rotated about said axis.

2. A device as defined in claim 1 further comprising a handle attached to said support rod for rotating said arcuate needles with said support rod around said shaft.

3. A device as defined in claim 1 further comprising a handle attached to said frame for supporting said engaging plate in a position so that the plate is in contact with said containers.

4. A device as defined in claim 1 further comprising an engaging edge provided on the upper end of said engaging plate so as to engage with the upper end of said container.

5. A device for separating seedling containers comprising:
 a frame,
 an engaging plate attached to said frame for engaging a plurality of seedling containers along the surface thereof,
 a pivot means attached to said frame,
 a plurality of arcuate needles rotatable about said pivot means for piercing each said container engaged with said surface to retain the containers engaged along the surface of the engaging plate.

6. The device according to claim 5 wherein the arcuate needles have their center of arc located at said pivot means.

7. The device according to claim 5 wherein the pivot means comprises stub shafts attached to said frame.

8. The device according to claim 5 further including a handle and a longitudinal rod adapted to be pivoted about said pivot means by said handle and which supports said needles in spaced relation along the length thereof.

* * * * *

UNITED STATES PATENT AND TRADEMARK OFFICE
CERTIFICATE OF CORRECTION

PATENT NO. : 3,923,332
DATED : December 2, 1975
INVENTOR(S) : ATSUSHI SHIROUZU

It is certified that error appears in the above-identified patent and that said Letters Patent are hereby corrected as shown below:

[73] Assignee: Kabushiki Kaisha Circle Tekko
Hokkaido, Japan

Signed and Sealed this thirteenth Day of April 1976

[SEAL]

Attest:

RUTH C. MASON
*Attesting Officer*

C. MARSHALL DANN
*Commissioner of Patents and Trademarks*